(12) United States Patent
Nakao

(10) Patent No.: US 10,285,193 B2
(45) Date of Patent: May 7, 2019

(54) WIRELESS COMMUNICATION SYSTEM AND WIRELESS APPARATUS

(71) Applicant: THE UNIVERSITY OF TOKYO, Tokyo (JP)

(72) Inventor: Akihiro Nakao, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 14/770,789

(22) PCT Filed: Feb. 26, 2014

(86) PCT No.: PCT/JP2014/054774
§ 371 (c)(1),
(2) Date: Aug. 26, 2015

(87) PCT Pub. No.: WO2014/133047
PCT Pub. Date: Sep. 4, 2014

(65) Prior Publication Data
US 2015/0382377 A1 Dec. 31, 2015

(30) Foreign Application Priority Data
Feb. 27, 2013 (JP) ................................. 2013-036654

(51) Int. Cl.
*H04W 74/00* (2009.01)
*H04W 12/08* (2009.01)
*H04L 5/00* (2006.01)
*H04W 12/06* (2009.01)
*H04W 72/04* (2009.01)
(Continued)

(52) U.S. Cl.
CPC ......... *H04W 74/002* (2013.01); *H04L 5/0048* (2013.01); *H04W 12/06* (2013.01); *H04W 12/08* (2013.01); *H04W 72/04* (2013.01); *H04W 48/12* (2013.01); *H04W 84/12* (2013.01)

(58) Field of Classification Search
None
See application file for complete search history.

(56) References Cited

U.S. PATENT DOCUMENTS

| 2010/0232337 A1* | 9/2010 | Das | H04W 4/12 370/312 |
| 2012/0233338 A1* | 9/2012 | Hamachi | H04W 48/20 709/227 |
| 2013/0054536 A1* | 2/2013 | Sengupta | G06F 17/30289 707/654 |

FOREIGN PATENT DOCUMENTS

| JP | 2007-251500 A | 9/2007 |
| JP | 2012-520627 A | 9/2012 |
| WO | 2010/105192 A1 | 9/2010 |

OTHER PUBLICATIONS

International Search Report for PCT/JP2014/054774, dated Apr. 1, 2014.

(Continued)

*Primary Examiner* — Mohammad S Adhami
(74) *Attorney, Agent, or Firm* — Imaizumi IP Law, PLLC

(57) ABSTRACT

Provided are a wireless communication system, a wireless apparatus, and a program capable of effectively using an access point. wireless apparatus 10 receives content information to be transmitted, generates transmission object information including at least apart of the content information and a predetermined data pattern, and transmits a beacon signal including the generated transmission object information.

7 Claims, 7 Drawing Sheets

(51) Int. Cl.
  *H04W 84/12* (2009.01)
  *H04W 48/12* (2009.01)

(56) References Cited

OTHER PUBLICATIONS

Shohei Iijima, Kohei Ishibashi, "A Study on Efficiency of the Communication with Erasure Correction Code", IEICE Technical Report, dated Apr. 12, 2012, pp. 29-33, vol. 112, No. 9, The Institute of Electronics, Information and Communication Engineers, CS2012-6.
Written Opinion of the International Searching Authority for PCT/JP2014/054774, dated Apr. 1, 2014.
Japan Patent Office, Office Action for Japanese patent application No. 2013-036654, dated Dec. 20, 2016.

* cited by examiner

WIRELESS COMMUNICATION SYSTEM AND WIRELESS APPARATUS

TECHNICAL FIELD

The present disclosure relates to a wireless communication system including a wireless apparatus which transmits beacon signals, and the wireless apparatus.

BACKGROUND ART

In a wireless local area network (usually referred to as wireless LAN), a terminal which is going to start accessing using the wireless LAN receives authentication from an access point before starting communication. At the time of this communication start, beacon signals transmitted by the access point at a predetermined time interval may be used. Namely, the access point transmits signal including an identifier referred to as SSID (Service Set IDentifier) as a beacon signal. The terminal side receives this SSID, and determines an access point to which the terminal asks for authentication.

In order to avoid connection from a random user, an access point does not transmit any beacon signals, and does not respond to a response request transmitted from a terminal side to any access points. Namely, the stealth mode is set to the access point. However, focusing on a problem that the SSID may be leaked even in the stealth mode if communication with an authorized terminal is intercepted, the Patent Document 1 discloses a technology to encrypt the SSID and set the leading 1 by to "0x00" to represent that the encryption is performed.

PRIOR ART

Patent Document 1: Japanese Unexamined Patent Publication (Kokai) No. 2007-251500

SUMMARY

As mentioned above, in the wireless LAN, transmission/reception of user data (except for data necessary for the system, such as data for an authentication process) between a terminal and an access point cannot be performed before the terminal receives authentication from the access point. On the other hand, recently, wireless LAN access points have been widely set in various regions, and more effective use of the access points has been desired.

The present disclosure has been created in view of the above. One of the objectives of the present disclosure is to provides a wireless communication system and a wireless apparatus capable of effectively using an access point.

In order solve the above drawbacks of the prior arts, the present disclosure provides a wireless apparatus comprising a device which receives content information to be transmitted, a device which generates transmission object information including at least a part of the content information and a predetermined data pattern, and a device which transmits a beacon signal including the generated transmission object information.

EMBODIMENT

Figure 1:
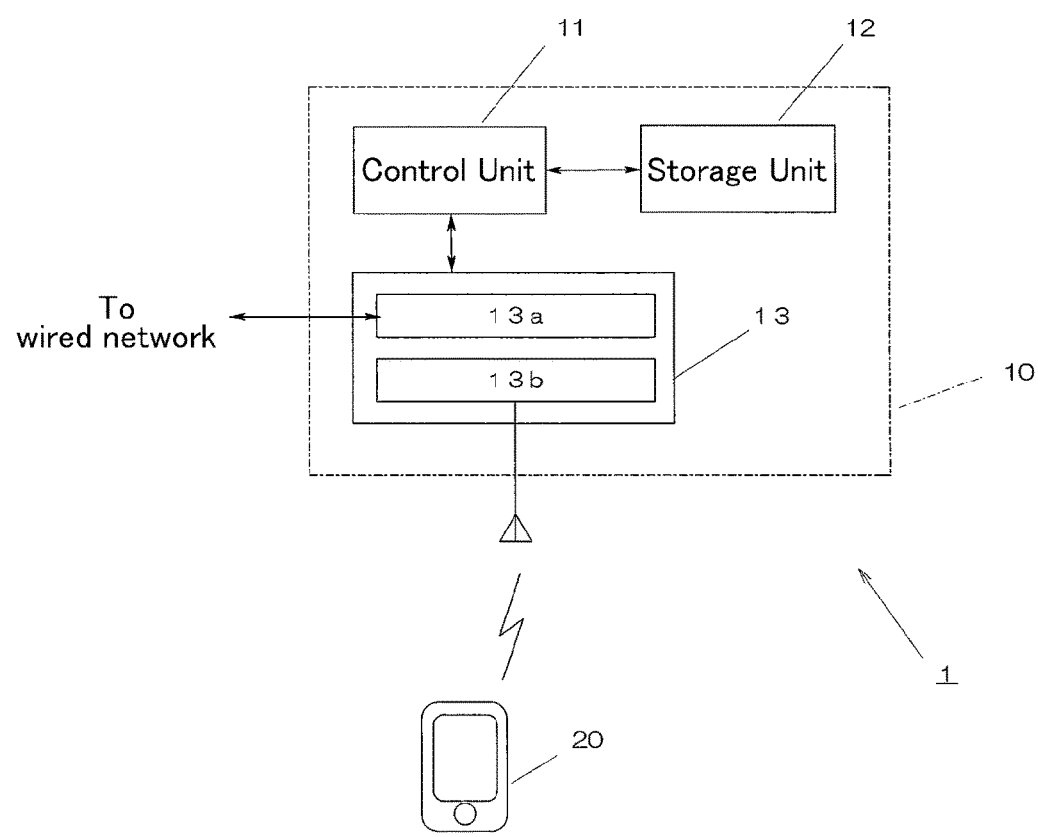
FIG. 1 is a block diagram showing a constitutional example of a wireless communication system according to an embodiment of the present disclosure.

An embodiment of the present disclosure will be explained with reference to the drawings. As exemplified in FIG. 1, a wireless communication system 1 according to an embodiment of the present disclosure comprises a wireless apparatus (access point) 10, and a terminal apparatus 20. Here, the wireless apparatus 10 is, for example, a wireless LAN access point which comprises a control unit 11, a storage unit 12, and a communication unit 13.

In the wireless apparatus 10 according to the present embodiment, the control unit 11 is a program-controlled device such as a CPU, which operates in accordance with a program stored in the storage unit 12. The control unit 11 executes ordinary processes as a control unit of a wireless LAN access point. Specifically, the control unit 11 periodically transmits a beacon signal including service set identification information (SSID). Further, according to the present embodiment, the control unit 11 receives content information to be transmitted, and transmits the content information by including the content information in the beacon signal. According to an example of the present embodiment, the control unit 11 divides the content information into data elements having predetermined data lengths. The control unit 11 generates a plurality of pieces of transmission object information each including each data element obtained by the division and a predetermined data pattern. Then, the control unit 11 treats the transmission object information as, for example, service set identification information, and transmits the transmission object information by including the transmission object information in the beacon signal. Detailed operations of the control unit 11 will be explained later below.

The storage unit 12 is a memory device, etc., and holds a program to be executed by the control unit 11. The program may be provided while being stored in a computer readable and non-transitory storage medium, such as a DVD-ROM (Digital Versatile Disc-Read Only Memory), etc., and stored in the storage unit 12. According to the present embodiment, the storage unit 12 also operates as a work memory of the control unit 11.

The communication unit 13 comprises a wired-side LAN interface 13a and a wireless-side LAN interface 13b. According to example of the present embodiment, the communication unit 13 receives the content information to be transmitted, through the wired-side LAN interface 13a, and outputs received content information to the control unit 11. Also, in response to instructions input from the control unit 11, the communication unit 13 transmits beacon signals through the wireless-side LAN interface 13b. Further, the communication unit 13 according to the present embodiment functions as a wireless-side LAN interface 13b and a wired-side LAN interface 13a of an ordinary LAN access point. Since this function is widely known, a detailed explanation therefor is omitted here.

The terminal apparatus 20 is a personal computer, a mobile phone, etc., provided with a wireless LAN interface. The terminal apparatus 20 according to the present embodiment is provided with a program-controlled device such a s a CPU, and in accordance with the operations of the program-controlled device, the terminal apparatus receives a beacon transmitted from a wireless apparatus, and extracts the transmission object information included in the received beacon. Then, the program-controlled device determines whether or not the extracted transmission object information includes a predetermined data pattern. As a result of the determination, if the extracted transmission object information includes a predetermined data pattern, the program-controlled device executes a process to reproduce at least apart of the content information on the basis of the transmission object information. The operations of the terminal apparatus 20 will be also descried later below.

Figure 2:
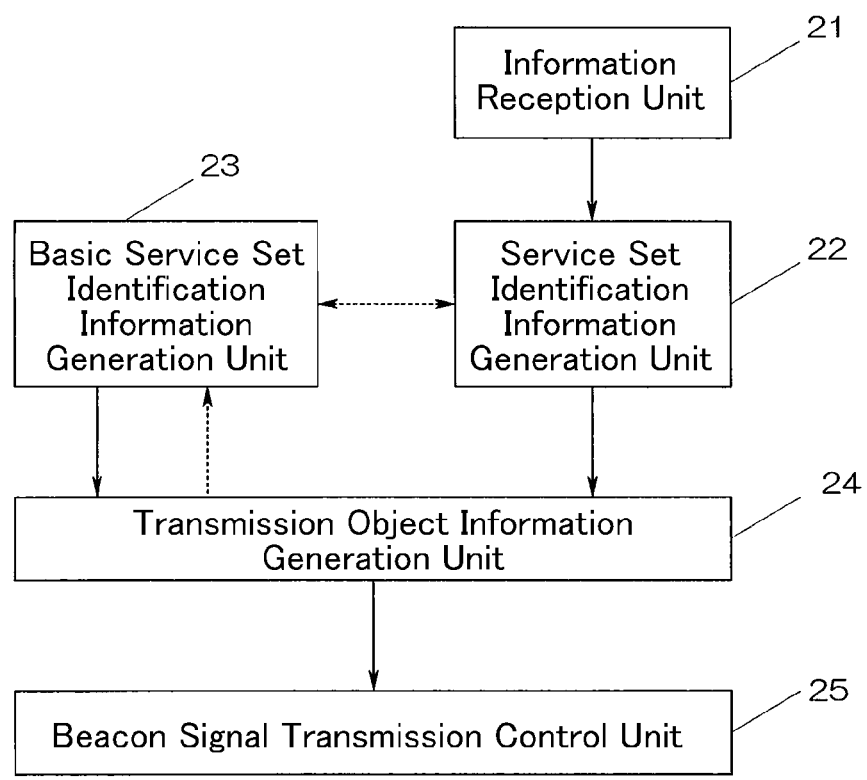
FIG. 2 is a functional block diagram showing an example of a wireless apparatus according to an embodiment of the present disclosure.

Here, specific operations of the control unit 11 will be explained. As exemplified in FIG. 2, the control unit 11 according to the present embodiment functionally comprises an information reception unit 21, a service set identification information generation unit 22, a basic service set identification information generation unit 23, a transmission object information generation unit 24, and a beacon signal transmission control unit 25.

The information reception unit 21 receives an input of content information to be transmitted, from the communication unit 13. The service set identification information generation unit 22 divides the content information received by the information reception unit 21, into k-pieces (k being an integer of 1 or more) of data fragments. This division is performed by dividing, for example, at a predetermined data length. Here, the data lengths should not be the same among all the data fragments, but should be at least 1 byte smaller than the size capable of being included in a beacon signal as the service set identification information.

Further, the service set identification information generation unit 22 divides the data fragments into groups, the number of data fragments in a group being β, and β being the number of data fragments capable of being included in one beacon signal. At this time, the service set identification information generation unit 22 determines unique group identification information for each group, and the group identification information is stored in association with information which specifies data fragments belonging the group identified by the corresponding group identification information. According to an example of the present embodiment, the size of service set identification information which can be included in a beacon signal is 255 bytes, and the service set identification information generation unit 22 divides the data fragments so that the initial fragment is 247 bytes and other data fragments are 254 bytes.

Figure 3A:
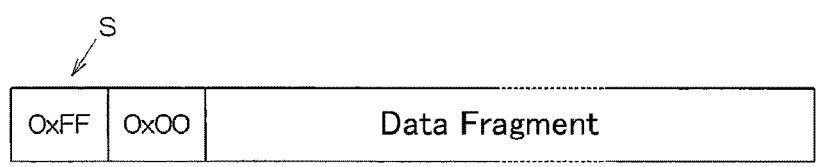
FIG. 3A, FIG. 3B, and FIG. 3C are explanatory views showing an content example of a transmission object information element according to an embodiment of the present disclosure.
Figure 3B:
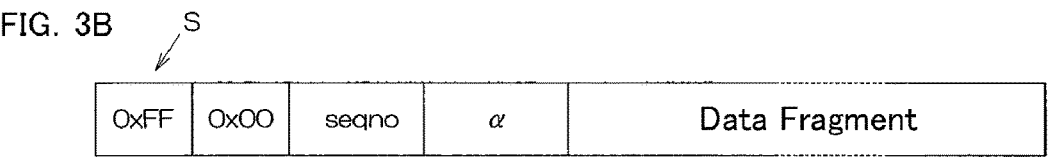

The service set identification information generation unit 22 generates a transmission object information element including a predetermined data pattern, with respect to each data fragment obtained by the division. As exemplified in FIG. 3A, for example, the data pattern is provided at the lead thereof with a data size (S) of the transmission object information element and a predetermined value ("0x00" (here, "0x" represents that the value thereafter is a hexadecimal number)). As exemplified in FIG. 3B, the first data fragment may be further provided with the unique content identifier (ID) for the content information to be transmitted, the group identification information (sequence number; seqno) of the group to which the data fragment belongs, and the information (a) indicating the total number of data fragments. The service set identification information generation unit 22 outputs the transmission object information element generated as above for each data fragment, to the transmission object information generation unit 24.

Namely, in the present example, a pieces of the transmission object information elements are generated corresponding to the data fragments, and the group identification information is from "1" to "n" (n being the minimum integer which exceeds the quotient obtained by dividing the total number α of the data fragments by the number β of the data fragments which can be included in one beacon signal).

The basic service set identification information generation unit 23 generates basic service set identification information (BSSID). The basic service set identification information is, for example, the MAC (Media Access Control) address of the wireless-side LAN interface 13b, as it is. In the MAC address, the higher 24 bits are referred to as the OUI (Organizationally Unique Identifier) for identifying an manufacturer, and the lower 24 bits are referred to as unique identification information determined by the manufacturer itself.

The transmission object information generation unit 24 receives the transmission object information elements generated by the service set identification information generation unit 22, and the basic service set identification information generated by the basic service set identification information generation unit 23. Then, the transmission object information generation unit 24 generates frames of a beacon signal including the received information as transmission object information.

Figure 4:
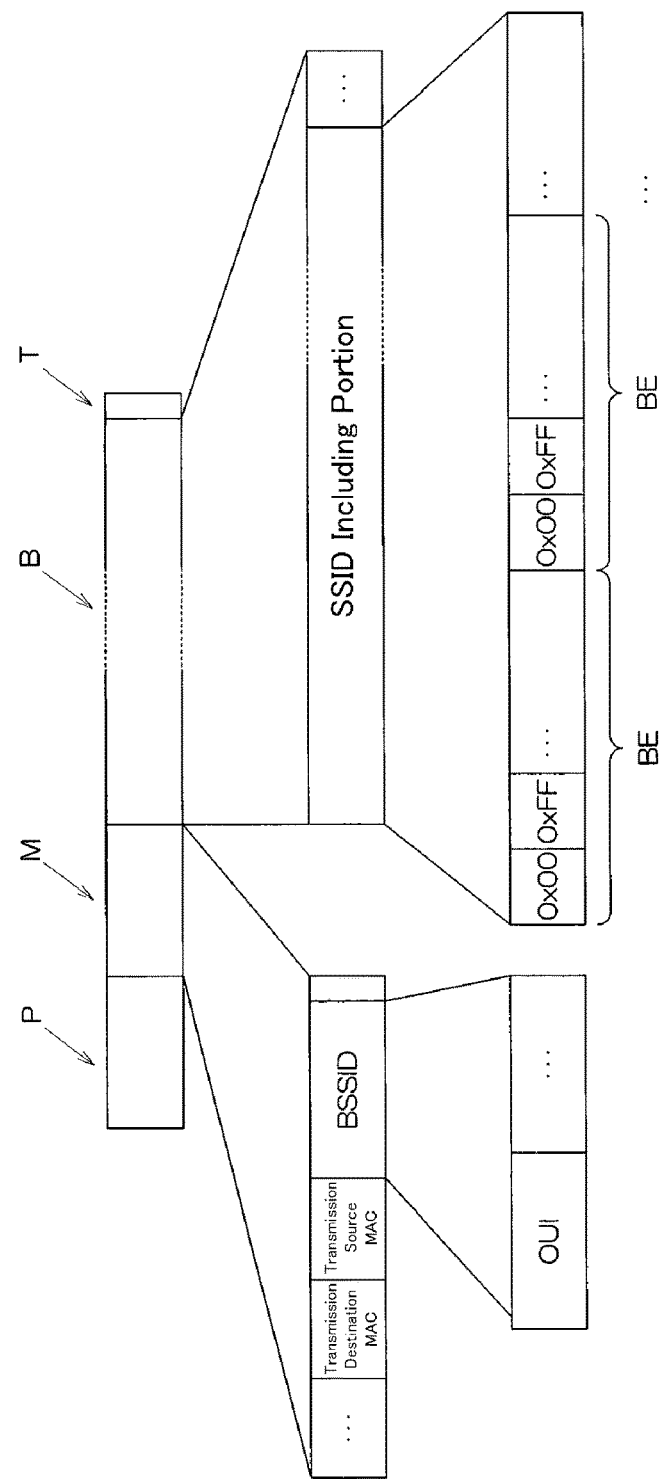
FIG. 4 is an explanatory view showing an example of frames of a beacon signal generated by a wireless apparatus according to an embodiment of the present disclosure.

Specifically, the transmission object information for one beacon signal, generated by the transmission object information generation unit 24, includes, a preamble (P), a MAC header (M), a signal body (B), and a trailer (T), as exemplified in FIG. 4. The MAC header (M) includes the basic service set identification information (BSSID) received from the basic service set identification information generation unit 23. Even when the basic service set identification information is used as a MAC address, the MAC header (M) usually includes the MAC address of the wireless-side LAN interface 13b as a MAC address of the transmission source.

Further, the signal body (B) of the transmission object information for one beacon signal includes transmission object information elements (BE), the number of the transmission object information elements (BE) being the number of data fragments which can be included in one beacon signal. Each transmission object information element (BE) is provided at its lead with a predetermined value as a delimiter (here, "0x00").

The transmission object information generation unit 24 generates n=[α/β] pieces of transmission object information, each including β transmission object information elements selected from α transmission object information elements received from the service set identification information generation unit 22. Here, [*] represents a minimum integer which exceeds *.

The beacon signal transmission control unit 25 controls the wireless-side LAN interface 13b to transmit the n pieces transmission object information generated by the transmission object information generation unit 24 as beacon signals at a predetermined interval. According to an example of the present embodiment, the transmission interval may be approximately 20 milliseconds, which is slightly longer than the transmission interval of the conventional beacon seconds including the service set identification information (SSID). Thereby, more opportunities can be provided for communication by signals other than the beacon signals.

Figure 5:
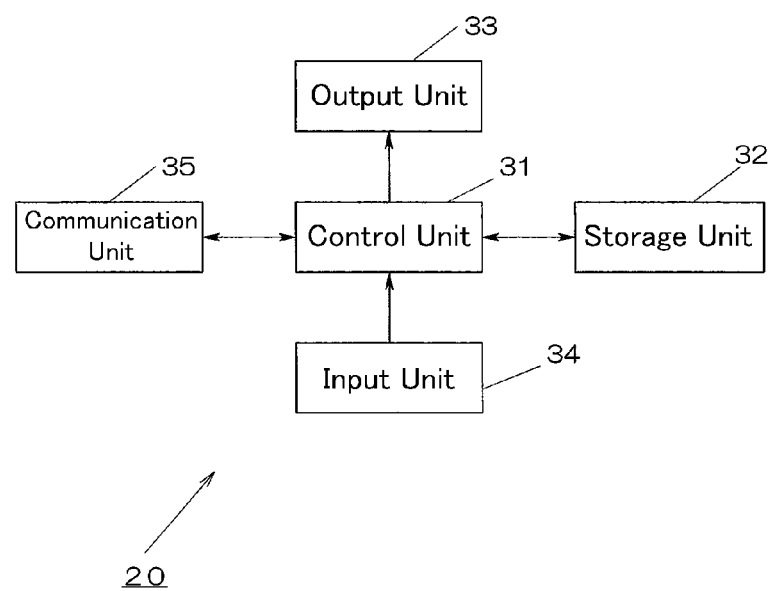
FIG. 5 is a block diagram showing an constitutional example of a terminal apparatus according to an embodiment of the present disclosure.

Next, the operations of the terminal apparatus 20 side will be explained. As exemplified in FIG. 5, the terminal apparatus 20 according to the present embodiment comprises a control unit 31, a storage unit 32, an output unit 33, an input unit 34, and a communication unit 35.

The control unit 31 is a program-controlled device such as a CPU, etc., and operates in accordance with a program store in the storage unit 32. The control unit 31 communication with the wireless apparatus 10 through the communication unit 35. The detailed operations of the control unit 31 will be described later below.

The storage unit 32 is a memory device, etc., and holds a program to be executed by the control unit 31. The program may be provided while being stored in a computer readable and non-transitory storage medium, such as a DVD-ROM (Digital Versatile Disc-Read Only Memory), etc., and stored in the storage unit 32. The storage unit 32 also operates as a work memory of the control unit 31. The output unit 33 comprises a display, a speaker, etc., which display information in response to the instructions input from the control unit 31, or provide a sound in response to the instructions.

The input unit 34 comprises a touch panel, a microphone, etc. The input unit 34 receives the input of instruction operation from a user, and outputs the content of the instruction operation to the control unit 31. Further, the input unit 34 outputs the sound input through a microphone, etc., to the control unit 31.

The communication unit 35 is provided with a wireless LAN interface, receives beacon signals transmitted form the wireless apparatus 10, and output information included in the received beacon signals to the control unit 31. Further, the communication unit 35 transmits/receives various data to/from the wireless LAN access point, in accordance with instructions input from the control unit 31.

Specific operations of the control unit 31 of the terminal apparatus 20 will be described. The control unit 31 acquires service set identification information (SSID) of a wireless LAN access point located near the terminal apparatus 20, from the beacon signals reaching the wireless LAN interface. Further, the control unit 31 uses the acquired SSID to have connection for communication with the wireless LAN access point. When the connection is established, the control unit 31 starts data transmission/reception to/from the wireless LAN access point.

Further, in the terminal apparatus 20 according to the present embodiment, when the service set identification information included in the received beacon signal includes a predetermined data pattern, the control unit 31 does not use the service set identification information as information for identifying a wireless LAN access point, and executes processes to extract content information from the service set identification information.

For example, when the second byte, from the lead, of the service set identification information included in the received beacon signal is "0x00", the control unit 31 determines that the service set identification information includes a predetermined data pattern. Then, the control unit 31 refers to the first service set identification information included in each beacon signal, and extracts a content identifier (ID), group identification information (sequence number; seqno) of a group to which the data fragment belongs, and information ($\alpha$) indicating the total number of data fragments.

At this time, if a storage area for the content information specified by the extracted content identifier has not been allocated, the control unit 31 allocates a storage area in the storage unit 32 for the information $\alpha$ representing the total number of extracted data fragments, and stores the data fragments in association with the extracted content information.

The control unit 31 extracts a data fragment from the i-th (i=1, 2, . . . , $\beta$) service set identification information included in the received beacon signal, and stores the extracted data fragment in the (seqno×$\beta$+i)-th storage area (the storage area corresponding to the extracted data fragment), the number (seqno× $\beta$+i) being obtained by multiplying the group identification information seqno by $\beta$, and adding i thereto.

Thereafter, each time when the control unit 31 receives a beacon signal, the control unit 31 refers to the service set identification information included in the received beacon signal, and stores each data fragment in a storage area corresponding to the content identifier of the content information included in the beacon signal and corresponding to the data fragment included in the beacon signal. When the reproduction of the original (before division) content information has become possible based on the data fragments stored in the storage areas, the control unit 31 reproduces the original (before division) content information from the data fragments stored in the storage areas, and outputs the reproduced content information through a display or a speaker of the output unit 33.

Figure 6:
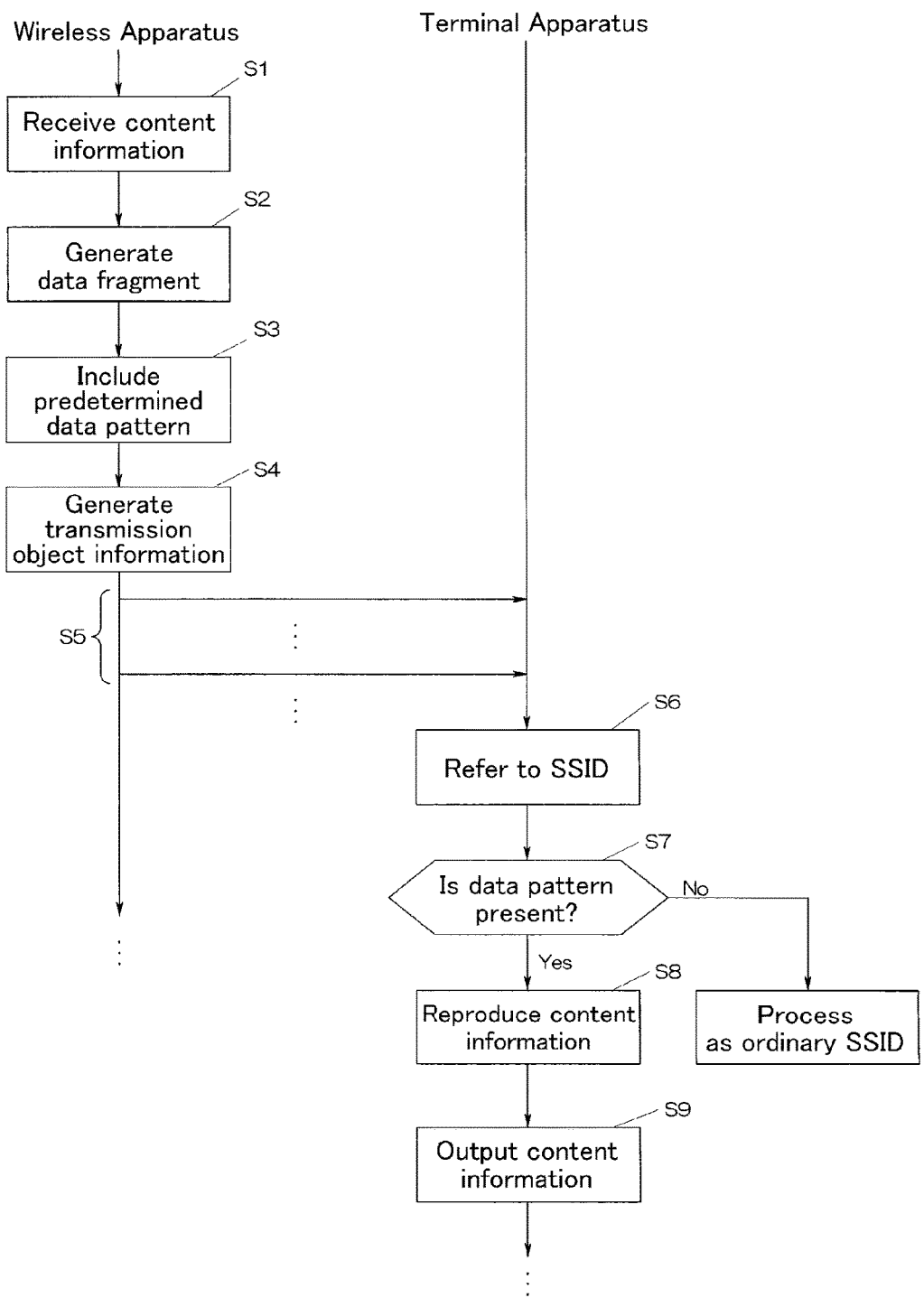
FIG. 6 is a flowchart showing an example of communication in a wireless communication system according to an embodiment of the present disclosure.

The wireless apparatus 10 and the terminal apparatus 20 according to the present embodiment are basically structured as above, and operate as follows. Namely, as exemplified in FIG. 6, the wireless apparatus 10 receives an input of content information from a provider of the content information (S1), and divides the content information into a data fragments (S2). Here, the content information may be binary information such as, for example, image data, sound data, etc., or may be character string information. According to an example of the present embodiment, the content information includes a document data described in HTML (HyperText Markup Language), and multimedia data representing an image, etc., referred to by the document data.

The wireless apparatus 10 generates groups each including $\beta$ data fragments out of $\alpha$ data fragments, provides each data fragment belonging to each group with a predetermined data pattern by applying "0x00" to the second byte (S3). Also, the wireless apparatus 10 generates $\alpha$-pieces of service set identification information by providing the lead byte of each data fragment with data representing the size obtained by adding 2 bytes to the size of the data fragment. Then, the wireless apparatus 10 generates transmission object information elements, each including $\beta$-pieces, out of $\alpha$-pieces, of the service set identification information. The wireless apparatus 10 generates n-pieces of transmission object information each including $\beta$ transmission object information elements (S4). Then, the wireless apparatus 10 sequentially transmits the n-pieces of transmission object information as beacon signals (S5).

The terminal apparatus 20 receives the beacon signals transmitted from the wireless apparatus 10, and refers to the service set identification information included in the received beacon signals (S6). Here, in the service set identification information included in the beacon signal transmitted from the wireless apparatus 10, the second by is "0x00", representing that a predetermined data pattern is included (S7). Thus, the terminal apparatus 20 determines that the service set identification information includes a data fragment. In this case, the terminal apparatus 20 extracts α-pieces of service set identification information, from the beacon signals sequentially transmitted from the wireless apparatus 10 as n-pieces of transmission object information. When the terminal apparatus 20 succeeds in extracting the α-pieces of service set identification information, the terminal apparatus 20 combines the α-pieces of service set identification information and reproduces the content information (S8). Then, the terminal apparatus 20 outputs the reproduced content information to display the same, etc. (S9).

In Step S7, if the predetermined data pattern is not included in the service set identification information included in the received beacon signal, the terminal apparatus 20 performs processes by using the relevant service set identification information same as the ordinary service set identification information for specifying a wireless LAN access point According to the example of the present embodiment, the second byte (the first byte excluding the size information) of the service set identification information is "0x00", which means, for an ordinary terminal performing wireless LAN communication, that SSID starts with "0x00". However, in general, "0x00" means the end of a character string. Thus, an ordinary terminal performing wireless LAN communication identifies the service set identification information including the data fragment and transmitted from the wireless apparatus 10, as an empty character string, and ignores processing. Accordingly, the wireless apparatus 10 and the terminal apparatus 20 can transmit and receive content information therebetween, without disturbing the operations of other wireless LAN terminals.

In the present example, when the service set identification information includes the predetermined data pattern, the terminal apparatus 20 always perform processes considering that the service set identification information includes a data fragment generated from the content information. However, taking into account other services such as the case where another wireless LAN access point provides a service disclosed in Patent Document 1, the terminal apparatus 20 may refer to not only the data pattern, but also the basic service set identification information, to determine whether or not the service set identification information includes the data fragment.

Specifically, the terminal apparatus 20 receives a beacon signal transmitted from the wireless apparatus 10, refers to service set identification information included in the received beacon signal, and examines whether or not the service set identification information includes a predetermined data pattern (for example, whether or not the second byte is "0x00"). At this time, if the service set identification information includes the predetermined data pattern, the terminal apparatus 20 further refers to the basic service set identification information included in the received beacon signal, and if the OUI included in the basic service set identification information is identical with a predetermined value (meaning that the manufacturer is a predetermined manufacturer), the terminal apparatus 20 determines that the service set identification information includes the data fragment.

In the above explanation, the wireless apparatus 10 side sets the MAC address of the wireless-side LAN interface 13b, as the basic service set identification information. However, the present embodiment is not limited thereto. Specifically, depending on the implementation, the terminal apparatus 20 may not perform any processes and ignore the service set identification information transmitted together with basic service set identification information which is the same as the basic service set identification information transmitted together with the service set identification information received in the past. In this case, the terminal apparatus 20 only processes the initially received β-pieces of service set identification information, and thus, the data fragments in the number necessary for reproducing the content information may not be obtained.

Therefore, according to an example of the present embodiment, the control unit 11 of the wireless apparatus 10 may execute the following processes as the basic service set identification information generation unit 23. Namely, the control unit 11 functioning as the basic service set identification information generation unit 23, applies OUI predetermined as identification of a manufacturer, to the higher 24 bits of the basic service set identification information. Also in this case, the basic service set identification information generation unit 23 applies 24-bit information which varies for each beacon signal, to the lower 24 bits of the basic service set identification information The wireless apparatus 10 may include such information varying for each beacon signal in the basic service set identification information, only when the predetermined data pattern is included in the service set identification information (namely, only when the service set identification information includes a data fragment).

Here, the 24-bit information varying for each beacon signal may be, for example, information varying for each transmission of a beacon signal itself, such as character string information representing a data fragment or transmission time and date, or information of a hash value, etc., on the basis of such varying information. By providing different basic service set identification information among beacon signals, the terminal apparatus 20 processes all service set identification information transmitted from the wireless apparatus 10

Further, in the above explanation, the entirety of the lower 24 bits of the basic service set identification information is the information varying for each beacon signal. However, the present embodiment is not limited thereto. According an example of the present embodiment, the control unit 11 of the wireless apparatus 10 executes processes as the basic service set identification information generation unit 23 by applying OUI predetermined for identifying the manufacturer to the higher 24 bits, applying information for specifying a data format of service set identification information including a data fragment (data format specifying information) to a part of the lower 24 bits, for example, the first 1 byte (8 bits) thereof, and applying information varying for each beacon signal to the remaining part of the lower 24 bits, i.e., the subsequent 16 bits in this example.

In this case, in accordance with needs, the terminal apparatus 20 may refer to the data format specifying information set in the 1 byte subsequent to the OUI in the basic service set identification information, specify the data structure of the service set identification information, and extract the data fragment in accordance with the settings of the specified data structure.

Figure 3C:
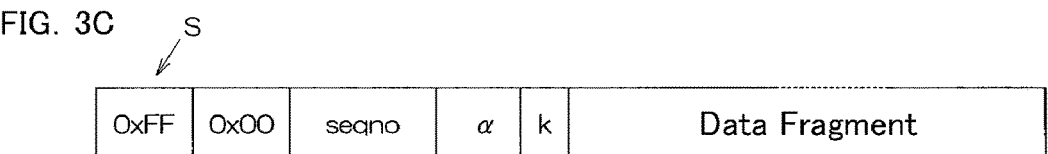

Further, in the present embodiment, the control unit 11 of the wireless apparatus 10 may not generate the data fragments by simply dividing the content information into a pieces, but may generate the data fragments by dividing the content information into m data fragments (here, the symbol "m" is used to be distinguishable from the above case) and encoding the m data fragments so that the original content information can be reproduced from the k (k<m) data fragments among the m data fragments. As a method for such encoding, the erasure code is known, and thus, the erasure code may be used therefor. An implementation example of the encoding process using the erasure code may be a library referred to as zfec, and this can be used for this encoding. Further, according to the present example, as shown in FIG. 3C, the wireless apparatus 10 may further include, in the first data fragment included in each beacon signal, the number k representing the number of data fragments capable of reproducing the original content information, in addition to the content identifier (ID) which is unique for each content information to be transmitted, the group identification information (sequence number; seqno) of a group to which the data fragment belongs, and the information (m) representing the total number of the data fragments.

Also in this case, when the terminal apparatus 20 determines that the service set identification information included in the received beacon signal includes a data fragment generated from the content information, the terminal apparatus 20 executes a process of extracting the data fragment from the service set identification information. Namely, the control unit 31 of the terminal apparatus 20 refers to the first service set identification information included in each beacon signal, and extracts the content identifier (ID), the group identification information (sequence number; seqno) of the group to which the data fragment belongs, the information (m) representing the total number of data fragments, and the number k represents the number of data fragments capable of reproducing the original content information.

Here, if the storage area for the content information specified by the extracted content identifier has not been allocated, the control unit 31 allocates storage areas for the extracted m data fragments in the storage unit 32, m being the information representing the total number of data fragments.

The control unit 31 extracts a data fragment from the i-th (i=1, 2, . . . , β) service set identification information included in the received beacon signal, and stores the extracted data fragment in the (seqno×β+i)-th storage area (the storage area corresponding to the extracted data fragment), the (seqno×β+i) being the number obtained by multiplying the group identification information seqno by β, and adding i thereto.

Thereafter, each time when the control unit 31 receives a beacon signal, the control unit 31 refers to the service set identification information included in the received beacon signal, and stores each data fragment in a storage area corresponding to the content identifier of the content information included in the beacon signal and corresponding to the data fragment included in the beacon signal. When k or more data fragments has been stored in the storage areas, and reproduction of the original (before division) content information has become possible, the control unit 31 reproduces the original (before division) content information from the data fragments stored in the storage areas, and outputs the reproduced content information through a display or a speaker of the output unit 33.

In the above explanation, the content identifier (ID) can be anything as far as each content information can be identified thereby. However, for example, if information relating to the type of the content information is included in the content identifier (ID), whether or not the processing should be performed can be selected on the basis of the designation by a user on the terminal apparatus 20 side.

Specifically, the content identifier (ID) may be determined in advance to include a type information part representing a type of the content information (which can be any appropriately determined type information, such as "restaurant information", "medical facility information", "clothing store information", etc.), and a unique information part.

A provider of the content information provides content information including a type information part corresponding to the type of the provided content information. Further, the terminal apparatus 20 receives, in advance, the setting regarding the type information to be received, from the user of the terminal apparatus 20. For example, a user may set to receive "restaurant information", but not to receive "clothing store information".

Then, the terminal apparatus 20 refers to the service set identification information included in the received beacon signal, and acquires the content identifier (ID) from the service set identification information if the data fragment generated from the content information is included. Then, the terminal apparatus 20 compares the type information part included in the acquired content identifier (ID) with the type information set to receive by the user. If they are identical, the process to reproduce the original content information from the data fragments is executed.

On the other hand, if the type information part included in the acquired content identifier (ID) is not identical with the type information set to receive by the user, the process to reproduce the original content information from the data fragments is not executed.

Further, when the wireless apparatus 10 generates a data fragment, there may be a case where the size of the content information should be a predetermined size, such as an integral multiple of a predetermined size (this may be required for an encoding process, for example). For example, in case that the size of the original content information should be Sn, but the size thereof is Sc (Sc<Sn−j (wherein, j represents a predetermined number for byte)), the content information is provided at its end with padding data (meaningless data) having Sp=(Sn−Sc−j) byte, and further provided with data having j-byte subsequent to the padding data, the j-byte data representing that the size of the padding data is Sp=(Sn−Sc−j) byte (wherein, j does not have to be an integer, namely, does not have to be a value representing the multiple of 8 bits).

In this case, after reproducing the content information, the terminal apparatus 20 refers to the j-byte at the end (the value for j is known at the terminal apparatus 20), and obtains the size Sp=(Sn−Sc−j) of the padding data. Then, the terminal apparatus 20 extracts (Sc=Sn−Sp−j) byte of data from the lead from the reproduced content information, to thereby obtain the original content information.

Further, in the wireless apparatus, the beacon signal transmission control unit 25 may change the time interval of beacon signal transmission depending on the type of the content information. For example, provided that the beacon signals are normally transmitted at the interval of 20 milliseconds, the transmission may be more often to transmit beacon signals at the interval of 5 milliseconds when the content information is "urgent". As a way of example, provided that a type information to be included in the content identifier (ID) and representing "urgent" is determined in advance, and the received content information includes a content identifier (ID) having a type information part representing "urgent", the beacon signal transmission control unit 25 sets the transmission interval of beacon signals including the data fragments generated on the basis of the content information, to 5 milliseconds, and the like.

Figure 7A:
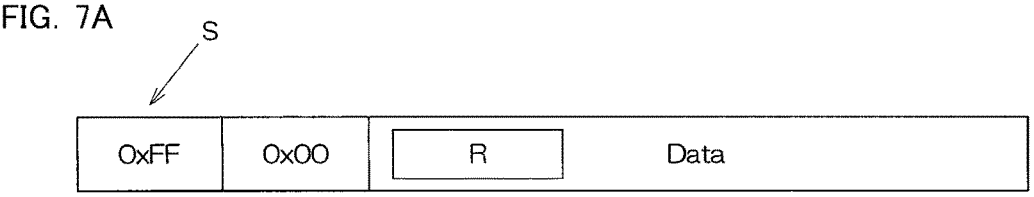
FIG. 7A and FIG. 7B are an explanatory views showing another content example of a transmission object information element according to an embodiment of the present disclosure.

Further, the service set identification information generation unit 22 may include a data pattern exemplified in FIG. 7A in the transmission object information element, that is, a data pattern provided with a data size (S) of the transmission object information element at the lead, a predetermined value "0x00", and a data portion (R) matching to a previously determined regular expression. For example, the service set identification information generation unit 22 may include a pattern in which a predetermined symbol, for example "%", and three-digit number subsequent to the symbol are arranged (corresponding regular expression may be represented by, for example, "% [0-9] [0-9] [0-9]"). Also in this case, the first data fragment may be further provided with the unique content identifier (ID) for the content information to be transmitted, the group identification information (sequence number; seqno) of the group to which the data fragment belongs, and the information (α) indicating the total number of data fragments.

In case of this example, if the second byte of the service set identification information included in the received beacon signal is "0x00" and the portion (R) matching to the predetermined regular expression is included in the service set identification information, the control unit 31 of the terminal apparatus 20 determines that the service set identification information includes a predetermined data pattern, and executes the process for reproducing the content information.

Figure 7B:
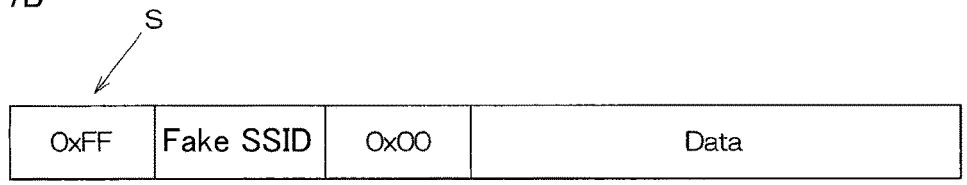

Further, the service set identification information generation unit 22 may include a data pattern exemplified in FIG. 7B in the transmission object information element, that is, a data pattern provided with a data size (S) of the transmission object information element, a predetermined character string arranged subsequent to the data size (the character string may be recognized as SSID by an ordinary terminal, and thus, here, the character string is referred as a fake SSID), and "0x00" (representing the end of the character string) arranged subsequent thereto. In this case, the service set identification information generation unit 22 may further include data matching to a predetermined regular expression (conveniently referred to as a sub-pattern) in the transmission object information element. Also in this case, the first data fragment may be further provided with the unique content identifier (ID) for the content information to be transmitted, the group identification information (sequence number; seqno) of the group to which the data fragment belongs, and the information (α) indicating the total number of data fragments.

In case of this example, the control unit 31 of the terminal apparatus 20 extracts the fake SSID arranged in a portion from the lead to the "0x00" (data representing the end of character string) of the service set identification information included in the received beacon signal. If the fake SSID is identical with a predetermine character string, or if the fake SSID is identical with a character string matching to the predetermined regular expression, the control unit 31 of the terminal apparatus 20 determines that the service set identification information includes a predetermined data pattern, and executes the process for reproducing the content information.

In this example, if a sub-pattern is included, the control unit 31 of the terminal apparatus 20 extracts the fake SSID arranged in a portion from the lead to the "0x00" (data representing the end of character string) of the service set identification information included in the received beacon signal. If the fake SSID is identical with a predetermine character string or a character string matching to the predetermined regular expression, and a sub-pattern matching to the predetermined regular expression is included in the service set identification information, the control unit 31 of the terminal apparatus 20 determines that the service set identification information includes a predetermined data pattern, and executes the process for reproducing the content information.

EXPLANATION ON NUMERALS

1 wireless communication system, 10 wireless apparatus, 11, 31 control unit, 12, 32 storage unit, 13, 35 communication unit, 20 terminal apparatus, 21 information reception unit, 22 service set identification information generation unit, 23 basic service set identification information generation unit, 24 transmission object information generation unit, 25 beacon signal transmission control unit, 33 output unit, 34 input unit.

The invention claimed is:

1. A wireless apparatus comprising,
 a device that receives content information to be transmitted,
 a device that generates transmission object information including at least a part of the content information and a predetermined data pattern, and
 a device that transmits, to a terminal device, a beacon signal including the generated transmission object information and basic service set identification information, wherein a part of the basic service set identification information is varied for each beacon signal,
 wherein the terminal device receives the beacon signal, ignores service set identification information transmitted together with the basic service set identification information when the basic service set identification information is the same as the base service set identification information received in the past, extracts the transmission object information included in the received beacon signal, determines whether or not the extracted transmission object information includes the predetermined data pattern when the basic service set identification information is varied, and executes a process to reproduce at least a part of the content information on the basis of the transmission object information when the extracted transmission object information includes the predetermined data pattern.

2. A wireless apparatus according to claim 1, wherein the transmission object information is service set identification information,
 the device which generates the transmission object information as the service set identification information, further comprises a device which, when the service set identification information includes the predetermined data pattern, generates information including predetermined identification information and the basic service set identification information, wherein the basic service set identification information is varied for each beacon signal, and
 the beacon signal transmitting device transmits the beacon signal including the transmission object information as the generated service set identification information, and the generated basic service set identification information.

3. A wireless apparatus according to claim 2, wherein the basic service set identification information generation device generates the basic service set identification information using identification information including information for specifying a data format of the content information, as the predetermined identification information.

4. A wireless apparatus according to claim 1, wherein the transmission object information generation means generates m data fragments on the basis of the original content information, the original content information being reproducible from k (m>k) data fragments selected from the m data fragments, and generates m-pieces of transmission object information each including the predetermined data pattern and the i-th (i=1, 2, . . . , m) data fragment.

5. A wireless apparatus according to claim 1, wherein the transmission object information generation means includes data which matches a predetermined regular expression, in the transmission object information element.

6. A wireless communication system comprising a terminal and a wireless apparatus which transmits beacon signals, the wireless apparatus comprising:
   a device that receives content information to be transmitted,
   a device that generates transmission object information including at least a part of the content information and a predetermined data pattern, and
   a device that transmits a beacon signal including the generated transmission object information and basic service set identification information, wherein the basic service set identification information includes an organizationally unique identifier and a part of the basic service set identification information is varied for each beacon signal;
   the terminal comprising:
   a device that receives the beacon signal transmitted from the wireless apparatus,
   a device that ignores service set identification information transmitted together with the base service set identification information when the basic service set identification information is the same as basic service set identification information received in the past, extracts the transmission object information included in the received beacon signal, and determines whether or not the extracted transmission object information includes the predetermined data pattern and whether or not an organizationally unique identifier included in the basic service set identification information is identical with a predetermined value, when the basic service set identification information is varied, and
   a device that executes a process to reproduce at least a part of the content information on the basis of the transmission object information when the extracted transmission object information includes the predetermined data pattern and the organizationally unique identifier included in the basic service set identification information is identical with a predetermined value.

7. A wireless communication system comprising a terminal and a wireless apparatus which transmits beacon signals, the wireless apparatus comprising:
   a device that receives content information to be transmitted,
   a device that generates transmission object information including at least a part of the content information and a predetermined data pattern, and
   a device that transmits a beacon signal including the generated transmission object information and basic service set identification information wherein a part of the basic service set identification information is varied for each beacon signal;
   the terminal comprising:
   a device that receives the beacon signal transmitted from the wireless apparatus,
   a device that ignores service set identification information transmitted together with the basic service set identification information when the basic service set identification information is the same as the basic service set identification information received in the past, and that extracts the transmission object information included in the received beacon signal transmitted together with the basic service set identification information when the basic service set identification information is not received in the past, and determines whether or not the extracted transmission object information includes the predetermined data pattern, and
   a device that executes a process to reproduce at least a part of the content information on the basis of the transmission object information when the extracted transmission object information includes the predetermined data pattern.

* * * * *